(12) United States Patent
Krebs

(10) Patent No.: US 9,442,638 B2
(45) Date of Patent: Sep. 13, 2016

(54) DISPLAY OF DATA ON A DEVICE

(71) Applicant: SAP SE, Walldorf (DE)

(72) Inventor: Friedhelm Krebs, Wieslòch (DE)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 13/973,854

(22) Filed: Aug. 22, 2013

(65) Prior Publication Data

US 2015/0058775 A1 Feb. 26, 2015

(51) Int. Cl.
*G06F 3/048* (2013.01)
*G06F 3/0484* (2013.01)
*G06F 17/30* (2006.01)
*G06F 3/0485* (2013.01)

(52) U.S. Cl.
CPC .......... *G06F 3/0484* (2013.01); *G06F 3/0485* (2013.01); *G06F 17/30321* (2013.01)

(58) Field of Classification Search
CPC .... G06F 3/0488; G06F 3/0346; G06F 3/017; G06F 3/0485; G06F 2203/04803; G06F 19/321
See application file for complete search history.

(56) References Cited

U.S. PATENT DOCUMENTS

| | | | |
|---|---|---|---|
| 6,006,161 A | 12/1999 | Katou | |
| 7,403,989 B2 | 7/2008 | Beringer et al. | |
| 7,894,860 B2 | 2/2011 | Moon et al. | |
| 8,295,892 B2 | 10/2012 | Kim et al. | |
| 8,351,773 B2 | 1/2013 | Nasiri et al. | |
| 2004/0013246 A1 | 1/2004 | Back et al. | |
| 2006/0285758 A1* | 12/2006 | Marugame | G06T 9/001 382/236 |
| 2007/0146337 A1* | 6/2007 | Ording | G06F 3/0485 345/173 |
| 2009/0091542 A1* | 4/2009 | Inaba | G06F 1/1616 345/173 |
| 2010/0082699 A1* | 4/2010 | Miyasa | G06F 19/321 707/802 |
| 2011/0143769 A1 | 6/2011 | Jones et al. | |
| 2011/0221664 A1* | 9/2011 | Chen | G06F 3/017 345/156 |
| 2012/0023438 A1 | 1/2012 | Xia et al. | |
| 2012/0096394 A1 | 4/2012 | Balko et al. | |
| 2012/0139945 A1 | 6/2012 | Choi | |
| 2012/0144305 A1 | 6/2012 | Bekiares et al. | |
| 2012/0159393 A1 | 6/2012 | Sethi | |
| 2012/0290914 A1 | 11/2012 | Lee et al. | |
| 2013/0102419 A1* | 4/2013 | Jeffery | A63B 69/00 473/409 |

* cited by examiner

*Primary Examiner* — William Bashore
*Assistant Examiner* — Rayeez Chowdhury
(74) *Attorney, Agent, or Firm* — Brakes Hughes Bellermann LLP

(57) ABSTRACT

A device may be configured to display a first item in a region of a user interface based on a first value of an index that is associated with the first item. Sensor data may be received from a sensor indicating an angular change of orientation of the device. The index may be incremented to a second value based on the sensor data. The second value may be associated with a second item. The second item may then be displayed in the region of the user interface based on the index being incremented to the second value.

20 Claims, 6 Drawing Sheets

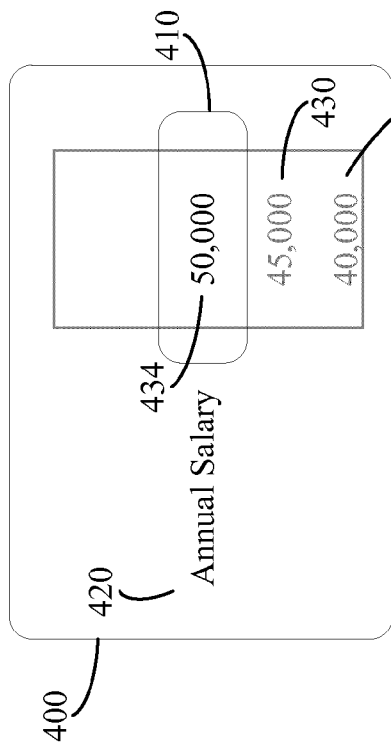
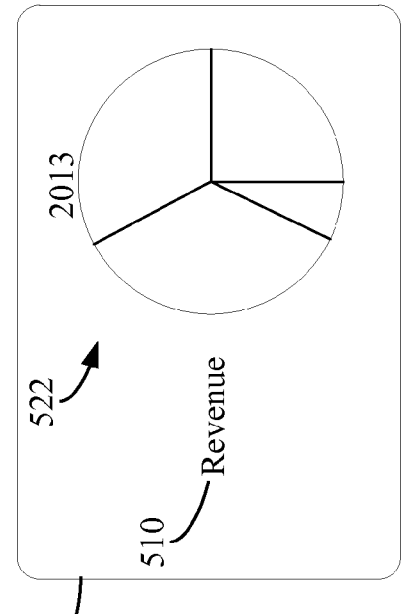
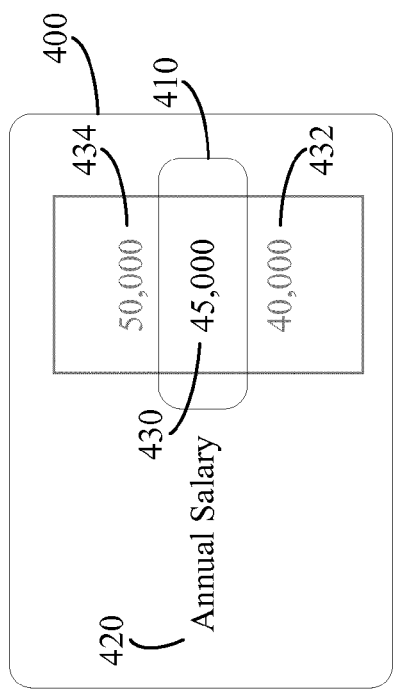
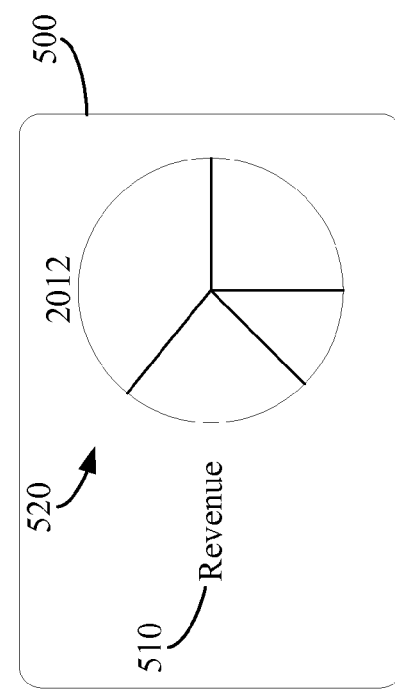
FIG. 4A  FIG. 5A
FIG. 4B  FIG. 5B

DISPLAY OF DATA ON A DEVICE

BACKGROUND

The processing power and capabilities of devices, including mobile devices such as smart phones, tablets, etc., have increased dramatically. Although the processing power and capabilities have increased, a trade-off for such devices may be screen size relative to the overall size of the device. Larger devices permit a greater viewable display area, but may be bulkier. Similarly, smaller devices are less bulky, but have a less viewable area. As a result, more information can be displayed on a larger device at a time and less information can be displayed on a smaller device. In some implementations, scrollable panes are used to access additional information on both devices. That is, a user of such devices may access and view additional information by using an input device, such as a mouse, a touch screen, etc., to scroll and cause the device to display additional information not currently displayed on the screen. Such scrollable features may require finger nimbleness or may require the use of a second hand (i.e., one hand to hold the device and a digit of another hand to scroll), which may result in the additional data not being readily available to the user of the device if they do not have the requisite finger nimbleness or their second hand is preoccupied.

SUMMARY

One implementation relates to a device having a sensor and a computer readable storage device. The computer readable storage device stores instructions that, when executed by one or more data processors of the device, cause the one or more data processors to perform several operations. The operations may include receiving data having a first item and a second item. The first item may be associated with a first value of an index and the second item may be associated with a second value of the index. The operations may further include receiving the first value of the index. The operations include displaying the first item in a region of a user interface displayed on a display of the device based on the first value of the index. The operations also include receiving first sensor data from the sensor of the device. The first sensor data may be indicative of a first angular change of orientation of the device. The operations may include determining if the first sensor data exceeds a predetermined value. The index may be incremented to the second value if the first sensor data exceeds the predetermined value. The operations may further include displaying the second item in the region of the user interface displayed on the display of the device based on the index being incremented to the second value associated with the second item.

Another implementation relates to a method of incrementally displaying related items in a common region on a display of a mobile device. The method may include displaying, using a display module, a first item in a region of a user interface displayed on a display of a mobile device based on an index having a first value. The first value may be associated with the first item. A sensor module may receive first sensor data from a first sensor of the mobile device. The first sensor data may be indicative of an angular change of orientation of the mobile device. The sensor module may output a next event to increment the index to a second value based on the first sensor data relative to prior sensor data. A control module may increment the index to the second value in response to the outputted next event. The method may further include displaying, using the display module, a second item in the region of the user interface based on the index having the second value. The second value may be associated with the second item.

Yet another implementation relates to a device including a model module configured to define a set of items stored in a computer-readable storage device of the device. Each item of the set of items may be associated with a value of an index. The device may also include a sensor module configured to receive sensor data from one or more sensors of the device and to output an event based on the sensor data. The device may further include a control module configured to receive the event outputted by the sensor module and to modify the value of the index based on the received event. The device may yet further include a display module configured to display, in a common region of a user interface displayed on a display of the device, an item of the set of items based on the index indicating a corresponding value associated with the item.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 4A is an illustration of an example user interface showing a first numerical item being shown in a region of the user interface;

FIG. 4B is an illustration of the example user interface of FIG. 4A showing a second numerical item being shown in the region of the user interface after receiving sensor data indicating a change of angular orientation of the device;

FIG. 5A is an illustration of an example user interface showing a first image item of a time series being shown in a region of the user interface;

FIG. 5B is an illustration of the example user interface of FIG. 5A showing a second image item being shown in the region of the user interface after receiving sensor data indicating a change of angular orientation of the device;

Figure 1:
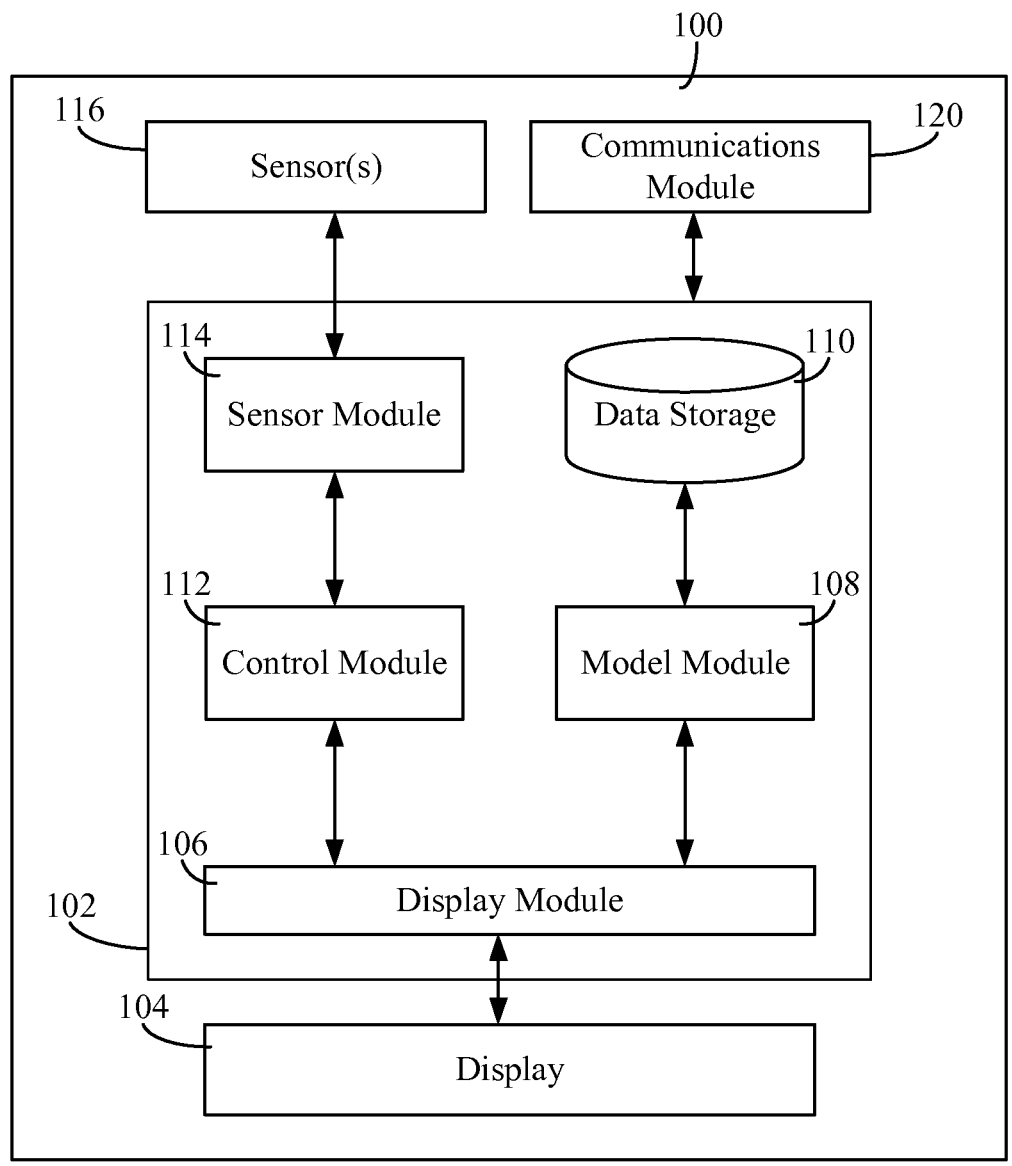
FIG. 1 is an overview illustration of an example of a device having a display module, a model module, a control module, and a sensor module for displaying data on a device.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for displaying data on a display of a device. The various concepts introduced above and discussed in greater detail below may be implemented in any of numerous ways, as the described concepts are not limited to any particular manner of implementation. Examples of specific implementations and applications are provided primarily for illustrative purposes.

For users of computing devices, including mobile devices, it may be useful to display two or more pieces of information at the same position on a display of the device, but having only one piece of information visible at a time. That is, swapping information at the same position such that the remainder of the displayed information remains the same may permit the user to maintain the context for the one or more pieces of information. For example, a user of a mobile device having a business application may utilize the business application to approve increases in salaries, budgets, etc. Such a user may find it useful to display the current value in a first instance and the proposed new value at a second instance. The current value and the proposed new value may not need to be displayed concurrently, but could be displayed in the same position, such as adjacent to the a label for "Annual Salary," "Budget," or the like for contextual purposes, and swapped based on a user input. Other examples may include displaying pair of numerical figures with related labels, several numerical values, time-dependent ordered series of numerical figures, alphanumerical values, images (e.g., time series images, actual versus target images, spatially related or adjacent images, etc.), tabular data, graphical data, or other data in the same space and swapping the displayed information based on the user input.

Swapping out the information at the same position while maintaining other displayed portions may also advantageously simplify and reduce the data that needs to be processed by the device and/or the data or coding for applications or files. For example, a common template for a record may be utilized and displayed once by the device and only the values may be swapped based on the user input.

The swapping between the information may be conveniently triggered by a change in the angular orientation of the device due to moving or rotating the hand holding the device. For example, a user of the device may pitch the device up or down to swap the displayed information. In other implementations, the user may swap the displayed information by rolling the device left or right. The angular orientation of the device can be detected and measured by the built-in sensors of the device. For example, devices, such as smart phones, tablets, or the like, may possess an accelerometer and/or a gyroscope that may be used to determine the current angular orientation of the device, a change in the angular orientation, an angular speed, and/or a rate of change of the angular orientation.

Swapping from first displayed information to other information may be transition-free or may be animated. The animation may be based on the type of information. For example, the display of a numerical time series may be animated to simulate the rotating of cylinder (e.g., in a similar manner to a reel of a slot machine). In another example, the display of images may be animated such that a first image is faded out while a second image is faded in (i.e., cross-fading) by changing the opacity of the images.

While the foregoing has provided an overview of implementations for displaying data on a device in the same position and swapping the data based on a user input, more specific examples and systems to implement such a system will now be described.

FIG. 1 is a block diagram of device 100 that can be used to implement the processes and methods for displaying data described herein. The device 100 of the present example may include a mobile computing device, such as a smart phone, a tablet, an e-reader, or other mobile devices. The device of the present example includes a processing module 102 coupled to a display 104 and, in some implementations, a communications module 120. The processing module 102 also includes a data storage 110. The data storage 110 may be a main memory, such as a Random Access Memory (RAM) or other dynamic storage device, for storing information and instructions to be executed by a data processor of the processing module 102. The data storage 110 can also be used for storing position information, temporary variables, or other intermediate information during execution of instructions by the processor. The data storage 110 may be a Read-Only Memory (ROM) or other static storage device for storing static information and instructions for the processing module 102. In some implementations, the data storage 110 may be a solid state device, magnetic disk or optical disk, for persistently storing information and instructions.

The processing module 102 is coupled to a display 104, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information and/or items to a user. An input device, such as a keyboard including alphanumeric and other keys, may be coupled to the processing module 102 for communicating information and command selections to the processing module 102. In another implementation, the input device may be integrated with the display 104, such as in a touch screen display. The input device may include a cursor control, such as a mouse or a trackball, for communicating direction information and command selections to the processing module 102 and for controlling cursor movement on the display 104.

The device 100 also includes a communications module 120 that may be coupled to the processing module 102 for providing a communication link between the device 102 and a network (not shown). As such, the communications module 120 enables the processing module 120 to communicate, wired or wirelessly, with other electronic systems coupled to the network. For instance, the communications module 120 may be coupled to a USB cord, an Ethernet line, an antenna, or other communications hardware that enables the device 100 to connect to the Internet, a wireless network, or another network.

The processing module 102 of the present example includes a data storage 110. The data storage 110 stores items, such as strings, numerical values, images, or other information, to be displayed on the display 104 of the device 100. In some implementations the data storage 110 may be part of the processing module 110, such as that shown in FIG. 1, or the data storage may be separate from the processing module 102 and communicatively coupled to the processing module 102. In yet another implementation, the data storage 110 may be remote from the device 100 (e.g., stored on a remote server, such as cloud data storage or otherwise) and may be accessed via the communications module 120.

The processing module 102 includes a model module 108 configured to access and retrieve the data for the items or other information stored in the data storage 110. The model module 108 is configured to define a set of items of the data storage 110, such as a set of strings or a set of images, based on a user interface control of the display module 106. Each item of the set of items may be associated or addressed by a corresponding value of an index denoting the items' position in the set. That is, a first item may be associated with a value of 1 for the index, a second item may be associated with a value of 2 for the index, a third item may be associated with a value of 3 for the index, etc. As will be described in greater detail herein, the association of the items or other information with the values of the index may be used by a display module 106 to retrieve data from the model module 108 to effect display of the item in a region of a user interface displayed by on the display 104 based on the associated value of the index.

The processing module 102 is further coupled to one or more sensors 116. The sensors may include a gyroscope, an accelerometer, a magnetometer, or other sensors. The one or more sensors 116 may output raw data to a sensor module 114 of the processing module 102 of the device 100. The sensor module 114 may be configured to receive the raw data from the one or more sensors 116 and output one or more events or other data to a control module 112 of the processing module 102.

In an example implementation, the sensor module 114 may receive the sensor data from a gyroscope and determine a current angular orientation for the device 100. The sensor data for a gyroscope may be an angular speed about an axis or may be an angular orientation calculated thereof. In some other implementations, the angular orientation can be derived from a magnetic field, such as that measured by a magnetometer, and a direction of gravity, such as that measure by an accelerometer. The sensor data for an accelerometer may be a raw acceleration or a relative acceleration (e.g., the acceleration of the device 100 after removing the effects of gravity). In some implementations, the sensor module 114 may also determine if the sensor data exceeds one or more predetermined values. For instance, the determination that the sensor data exceeds a predetermined value may include comparing sensor data output by the one or more sensors 116 at a first time (e.g., a datum for the device 100) to sensor data output by the one or more sensors 116 at a second time. The first and second times may be determined by a sensor polling interval. The sensor polling interval may be from 50 milliseconds, inclusive to 1 second, inclusive, such as 50 milliseconds, 100 milliseconds, 200 milliseconds, 250 milliseconds, 500 milliseconds, 1 second, etc. If the difference (e.g., an absolute difference) between the sensor data at the first time and the sensor data at the second time exceed the predetermined value, then the sensor module 114 may be configured to output an event. Such a predetermined value may be set such that the sensor module 114 does not output events for slight orientation changes of the device (i.e., by setting the predetermined value such that a gyroscope sensor indicates an absolute angular speed of greater than a certain value and/or an accelerometer sensor indicates an acceleration greater than a certain acceleration value). In some implementations, the predetermined value may be set by a user of the device 100 (e.g., using a configuration utility provided by the device 100 and/or a configuration utility provided by an application executing on the device 100) or may be set by a third-party, such as an application developer, a device manufacturer, etc.

In some implementations, several predetermined values may be implemented. For example, a first predetermined value may be set such that a difference between the received sensor data that is indicative of a change in angular orientation of between 10 degrees and 0 degrees, inclusive does not cause the sensor module 114 to output any event; a second predetermined value may be set such that a difference between the received sensor data that is indicative of a change in angular orientation of between 45 degrees, inclusive, and 10 degrees, inclusive, causes the sensor module 114 to output a first event; and a third predetermined value may be set such that a difference between the received sensor data that is indicative of a change in angular orientation between 45 degrees and 90 degrees, inclusive, causes the sensor module 114 to output a second event. Of course other values may be used and the foregoing are merely an example. In still further implementations, several ranges of differences may result in several different events.

In addition to, or in lieu of, the several predetermined values for the angular orientation, several predetermined values may be implemented for the received sensor data from the accelerometer. For example, a first predetermined value may be set such that no event is output by the sensor module 114 if the received sensor data from the accelerometer is below 0.1 meters per square second; a second predetermined value may be set such that a first event is a output by the sensor module 114 if the received sensor data from the accelerometer is between 0.1 meters per square second, inclusive, and 0.5 meters per square second, inclusive; and a third predetermined value may be set such that a second event is a output by the sensor module 114 if the received sensor data from the accelerometer is greater than 0.5 meters per square second. Of course other values may be used and the foregoing are merely an example. In still further implementations, several ranges of differences may result in several different events.

As will be discussed below, such various predetermined values may be used to increment or decrement an index, described in greater detail herein, by various values. Of course, such predetermined values may be omitted such that the sensor module 114 outputs an event in response to changes in the received sensor data.

The sensor module 114 is configured to output events to a control module 112 of the processing module 102. The event output by the sensor module 114 may be determined based on the direction of rotation of the device 100. For example, if the received sensor data from the one or more sensors 116 indicates a change in angular orientation of the device 100 indicative of a user pitching the device 100 up, then the sensor module 114 may be configured to output a "previous" event to the control module 112. Similarly, if the received data from the one or more sensors 116 indicates a change in angular orientation of the device 100 indicative of a user pitching the device 100 down, then the sensor module 114 may be configured to output a "next" event to the control module 112. Of course the foregoing may be reversed (e.g., pitching up of the device 100 causes the sensor module 114 to output a "next" event and pitching the device 100 down causes the sensor module 114 to output a "previous" event). In still other implementations, the change in angular orientation of the device 100 may be indicative of a user rolling the device 100 left or right to cause the sensor module 114 to output the "previous" or "next" events.

In some implementations, such as those utilizing several predetermined values, the sensor module 114 may be configured to output additional events, such as "5 previous," "10 previous," "5 next," "10 next," etc. That is, in addition to the binary configuration of "previous" and "next" events, the sensor module 114 may be configured to output several other events in response to different changes in angular orientation of the device 100 (e.g., a user may pitch the device 100 up between 10 degrees and 45 degrees to cause the sensor module 114 to output a "previous" event, and a pitch change of between 45 degrees and 90 degrees causes the sensor module 114 to output a "5 previous" event.).

In still further implementations, the sensor module 114 may also be configured to receive sensor data indicative of a change in angular speed. In implementations such as those utilizing several predetermined values, the sensor module 114 may be configured to output the additional events, such as "5 previous," "10 previous," "5 next," "10 next," etc., based on the gyroscope sensor data. For example, the sensor module 114 may receive sensor data indicative of a user pitching the device up and an angular speed greater than 2 radians per second, which may cause the sensor module 114 to output a "5 previous" event to the control module 112. Similarly, the sensor module 114 may receive sensor data indicative of a user pitching the device down and an angular speed greater than 2 radians per second, which may cause the sensor module 114 to output a "5 next" event to the control module 112.

In some implementations, the foregoing may be applied when the device is rolled left or right.

In an implementation, the sensor module 114 may be implemented by a Java™ class. For example, the class may implement a callback method, such as, for example, onSensorChanged. The method onSensorChanged may be called periodically by a sensor manager of the device 100 (e.g., a manager of the sensors for the device 100 that may be device-dependent and which outputs the raw data from the sensors). The method onSensorChanged receives the current raw sensor data for the one or more sensors 116 and an associated timestamp, which may be received from an internal clock of the device 100. In some implementations, the raw sensor data may be data indicative of an angle relative to a datum. For example, angular pitch and/or roll data may be measured relative to orthogonal axes of a plane extending through the device 100 when the device is horizontal relative to the force of gravity. The angular yaw data may be measured relative to an axis defined by the direction of magnetic North. Thus, a gyroscopic sensor 116 may output sensor data indicative of the angular orientation relative to the aforementioned axes or reference datums.

In other implementations, the raw sensor data may be a rate of rotation about an axis, such as an angular speed about a pitch axis, a roll axis, or a yaw axis. The pitch axis, roll axis, or yaw axis may be defined by orthogonal axes of a plane extending through the device 100 when the device is horizontal relative to the force of gravity and the axis corresponding to magnetic North. For angular speed raw sensor data, a prior timestamp from a prior poll of the sensor data may be used with the current timestamp to determine a change in time, Δt, which, when multiplied by the angular speed about one of the axes, results in a value for the degree of angular rotation, such as a pitch angle, roll angle, or yaw angle. As noted above regarding the predetermined values, if, over a short period of time, the angular speed is sufficiently large, thereby indicating a large change in the angle of orientation, and the angular speed does not change sign (i.e., the device 100 is being rotated in one direction), then the sensor module 114 may output an event, such as a "previous" event or a "next" event. The sign of the pitch rate, either positive or negative, may be used by the sensor module 114 to determine whether an event indicating "next" or "previous" is output by the sensor module 114.

Referring still to FIG. 1, the processing module 102 includes a control module 112 that receives the events output from the sensor module 114 and is configured to modify the index. The index is used to determine what item or information, based on being associated with a value of the index, is output to be displayed on the display 104 of the device 100. When the control module 112 receives a "previous" event from the sensor module 116, the control module 112 may decrement the index. Similarly, when the control module 112 receives a "next" event from the sensor module 116, the control module 112 may increment the index. The control module 112 may also receive a length of the index such that the control module 112 does not exceed the length of the index when incrementing the index. In addition, the control module 112 may be configured to not decrement the index below 1 or, in some implementations, 0.

In some implementations, such as those with additional event such as "5 previous," "10 previous," "5 next," "10 next," etc., when the control module 112 receives the event, the control module 112 may increment or decrement the index by an associated value, if possible (e.g., if a "5 previous" event is received by the control module 112, then the control module 112 will decrement the index by 5). In some implementations, if incrementing the index will result in the index exceeding the length of the index or decrementing the index will result in a value below 1 or 0, then the control module 112 may simply modify the value of the index to the ending index value, either the last index value if incrementing or 1 or 0 if decrementing. In some implementations, the control module 112 may also be configured to output an indication that the end of the index has been reached. In some implementations, the control module 112 may be configured to step through the incremented or decremented values. That is, instead of increasing or decreasing the index value by 5, the control module 112 may be configured to increment or decrement the index by 1 five times. Such step-wise incrementing or decrementing may be used to display the interim items or information on the display 104 of the device 102, such as during an animation showing the change of items or information through several values of the index.

The control module 112 is further configured to communicate with a display module 106 of the processing module 102 such that the display module 106 may retrieve, via the model module 108, a corresponding item or information from the data storage 110 based on the incremented or decremented index value. The display module 106 includes a user interface control that references the list of items or information of the model module 108 and the index of the control module 112, which is associated with a corresponding item or information of the list of items of the model module 108 to be displayed. The user interface control of the display module 106 receives the value of the index from the control module 112 and is configured to swap the information or item to be rendered on the display 104 based on the change to the index value. In some implementations, the user interface control of the display module 106 may be parameterized to make the swapping of information or items from the model module 108 animated. In addition, the user interface control of the display module 106 may further include color schemes, styles, or other attributes for displaying the items or information. Several different types of user interface controls may be defined for the display module 106 based on the type of information or items to be displayed. Examples of such user interface controls will be described in greater detail herein.

Figure 2:
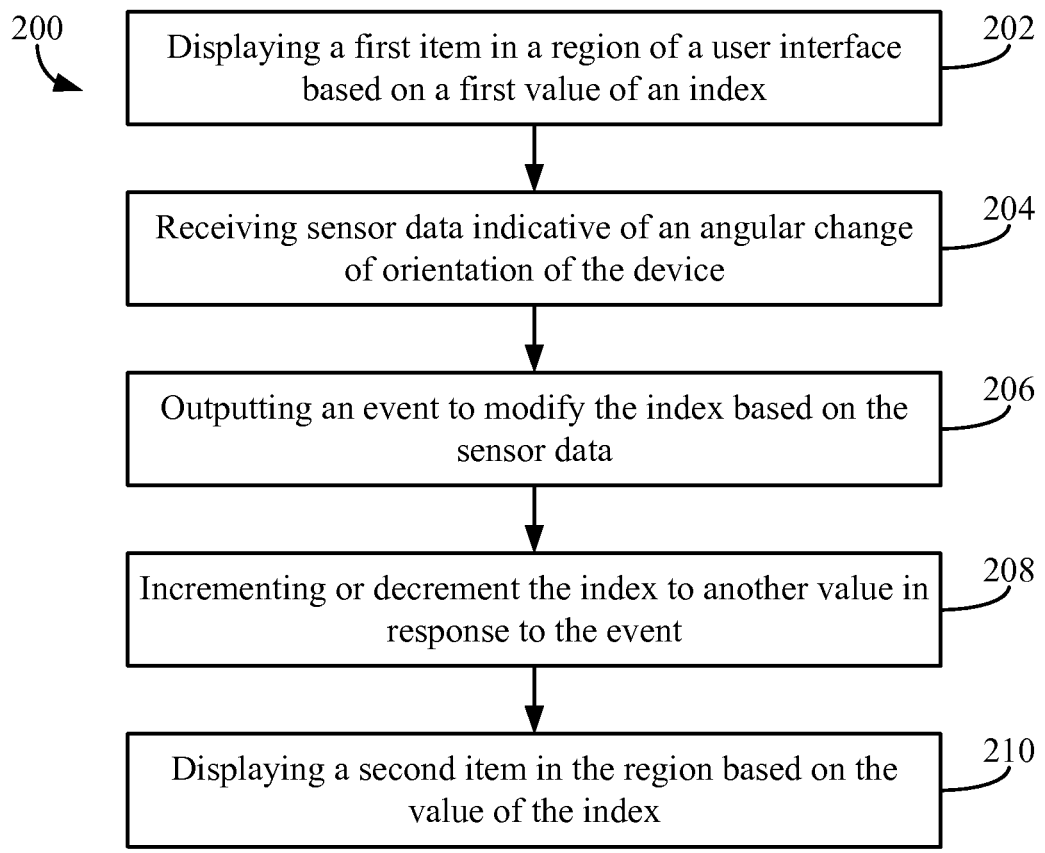
FIG. 2 is an example flow diagram for displaying items in a region of a user interface based on an index.

FIG. 2 depicts an example process 200 for displaying items in a region of a user interface based on an index that may be implemented using the device 100 of FIG. 1. The process 200 includes displaying a first item in a region of a user interface based on a first value of an index (block 202). For example, when a user interface is displayed on the display 104 of the device 100, a default value, such as 0, may initially be set as the value for the index by the control module 112. Accordingly, when an application is executing on the device 100 and displays the user interface via a user interface control of the display module 106, the display module 106 may receive the value of 0 from the control module 112 and retrieve display data to effect display of a corresponding first item that is associated with the 0 value of the index. The display module 106 may utilize the model module 108 to retrieve the data to effect display of the first item from the data storage 110.

Sensor data may be received that is indicative of an angular change of orientation of the device 100 (block 204). The sensor data may be received from the one or more sensors 116 of the device 100 by the sensor module 114. In some implementations, the output from the one or more sensors 116 may be pre-processed by a sensor manager of the device 100 (e.g., to discretize the voltage output from the one or more sensors 116) to output a raw numerical value for the sensor data. The sensor data may be indicative of an angular change of pitch of the device 100, an angular change of roll of the device 100, and/or an angular change of yaw of the device 100. In some implementations, the sensor data may also include data indicative of an angular speed of the device 100. In other implementations, the angular speed of the device 100 may be received as second sensor data from a second sensor, such as the gyroscope. The second sensor data may be used by the control module 112 to increment the index at an increment rate based on the second sensor data. For example, a rapid rotation may cause the control module 112 to increment through values of the index at a first increment rate. A slow rotation may cause the control module 112 to increment through values of the index at a second increment rate. The second increment rate may be less than the first increment rate.

An event to modify the index based on the sensor data may be outputted (block 204). As described above, the sensor module 114 may, based on the received sensor data, output a "previous" event, a "next" event, or other events (e.g., "5 previous," "10 previous," "5 next," "10 next," etc.). The event may be outputted to the control module 112 such that the control module 112 will modify a value of the index based on the outputted event.

The process 200 includes incrementing or decrementing the index to another value in response to the event (block 208). The control module 112 receives the event outputted by the sensor module 114 and, in response, modifies the value of the index, such as incrementing the value of the index in response to receiving a "next" event or decrementing the value of the index in response to receive a "previous" event. In some implementations, the control module 112 may be configured such that the control module will not increment the index beyond the length of a set of items associated with values of the index or decrement the index below a value of 1 or 0.

A second item is displayed in the same region of the user interface based on the value of the index (block 210). When the value of the index is incremented or decremented by the control module 112, the display module 106 may receive an indication that the index has been modified and may receive the new value for the index. Based on the new value for the index, the display module 106 retrieves display data to effect display of a corresponding second item that is associated with the new value for the index. The display module 106 may utilize the model module 108 to retrieve the data to effect display of the second item from the data storage 110. Thus, the second item replaces the first item in the region of the user interface in response to the change of angular orientation of the device 100. In some implementations, the display of the second item may include an animated transition from the first item to the second item. Such an animated transition may include rolling the second item into view and rolling the first item out of view, similar to a reel of a slot machine. In other implementations, the animated transition may include cross-fading from the first item to the second item. Still other animated transition may be implemented.

Figure 3:
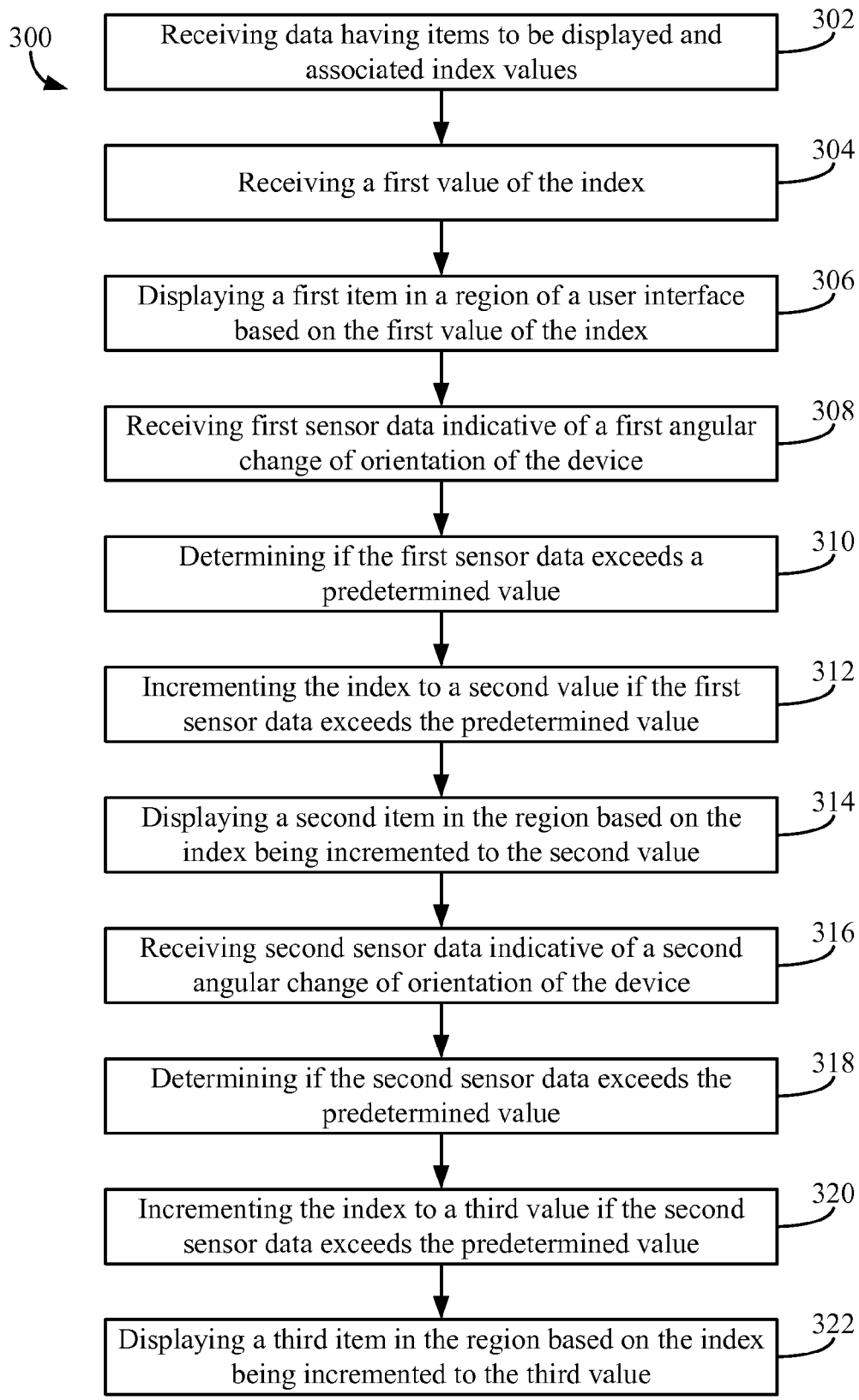
FIG. 3 is another example flow diagram for displaying items in a region of a user interface based on an index.

FIG. 3 depicts another example process 300 for displaying items in a region of a user interface based on an index that may be implemented using the device 100 of FIG. 1. The process 300 includes receiving data having items to be displayed and associated index values (block 302). The data, which may be stored in a storage device, such as data storage 110, may include a first item, a second item, and a third item. The first item may be associated with a first value of an index, the second item may be associated with a second value of the index, and the third item may be associated with a third value of the index. In other implementations, a plurality of items may each be associated with unique values of the index such that each item may be determined and retrieved based on the value of the index.

In some implementations, the first item, second item, and third item may be numerical items, string items, alphanumeric items, image items, a data table item, a graph or chart item, and/or other items. An example of numerical items are shown and described in reference to FIGS. 4A-4B. The image items may include temporally related images, such as a time series of annual revenue charts, a time series of images of construction of a building, a time series of images of a person aging, etc. An example of time series image items are shown and described in reference to FIGS. 5A-5B. In other implementations, the image items may be an actual state image item and a target state image item. An example of an actual state image item and a target state image item are shown and described in reference to FIGS. 6A-6B. In yet further implementations, the image items may be spatially related, such as a set of image items corresponding to computer tomography (CT) images. In other examples, the spatially related images may be a set of images along a road. In still other examples, the spatially related images may include floors of a building. Still other spatially related image items may be utilized as well. An example of a data table item and graph or chart item are shown and described in reference to FIGS. 7A-7B.

A first value of the index is received (block 304). For example, when a user interface is displayed on the display 104 of the device 100, a first value, such as a default value of 0, may be received, such as from the control module 112, as the first value of the index by the display module 106.

A first item is displayed in a region of a user interface based on a first value of the index (block 306). When the display module 106 receives the first value for the index, the display module 106 may retrieve display data to effect display of the first item that is associated with the first value of the index. The display module 106 may utilize the model module 108 to retrieve the data to effect display of the first item from the data storage 110.

First sensor data may be received that is indicative of a first angular change of orientation of the device 100 (block 308). The first sensor data may be received from the one or more sensors 116 of the device 100 by the sensor module 114. In some implementations, the output from the one or more sensors 116 may be pre-processed by a sensor manager of the device 100 (e.g., to discretize the voltage output from the one or more sensors 116) to output a raw numerical value for the first sensor data. The first sensor data may be indicative of an angular change of pitch of the device 100, an angular change of roll of the device 100, and/or an angular change of yaw of the device 100. In some implementations, the first sensor data may also include data indicative of an acceleration of the device 100.

A determination may be made whether the first sensor data exceeds a predetermined value (block 310). The sensor module 114 may receive the first sensor data and determine whether the first sensor data exceeds the predetermined value. As discussed above, the predetermined value may be set such that incidental rotations of the device 100 do not cause the sensor module 114 to output an event to increment or decrement the value of the index. In some implementations, several predetermined values may be utilized to provide for several different events to be outputted by the sensor module 114.

The value of the index may be incremented to the second value if the first sensor data exceeds the predetermined value (block 312). The control module 112 may increment the value of the index to the second value based on the first angular change of orientation of the device 100 that exceeds the predetermined value. In some implementations, the control module 112 may receive an event from the sensor module 114 to increment the value.

The second item is displayed in the region of the user interface based on the index being incremented to the second value (block 314). When the display module 106 receives the second value for the index from the control module 112, the display module 106 may retrieve display data to effect display of a corresponding second item that is associated with the second value of the index. The display module 106 may utilize the model module 108 to retrieve the data to effect display of the second item from the data storage 110. Thus, the second item replaces the first item in the region of the user interface in response to the change of angular orientation of the device 100. In some implementations, the display of the second item may include an animated transition from the first item to the second item. Such an animated transition may include rolling the second item into view and rolling the first item out of view, similar to a reel of a slot machine. In other implementations, the animated transition may include cross-fading from the first item to the second item. Still other animated transition may be implemented.

In some implementations, second sensor data may be received that is indicative of a second angular change of orientation of the device 100 (block 316). The second sensor data may be received from the one or more sensors 116 of the device 100 by the sensor module 114. The second sensor data may be indicative of an angular change of pitch of the device 100, an angular change of roll of the device 100, and/or an angular change of yaw of the device 100. In some implementations, the second angular change of orientation may be in a same direction as the first angular change of orientation (e.g., both changes are pitching the device 100 up). In other implementations, the second angular change of orientation may be in an opposite direction as the first angular change of orientation (e.g., the first angular change of orientation indicated a pitching up of the device 100 and the second angular change of orientation indicated a pitching down of the device 100).

A determination may be made whether the second sensor data exceeds the predetermined value (block 318). The sensor module 114 may receive the second sensor data and determine whether the second sensor data exceeds the predetermined value. The predetermined value may be set such that incidental rotations of the device 100 do not cause the sensor module 114 to output an event to increment or decrement the value of the index. In some implementations, several predetermined values may be utilized to provide for several different events to be outputted by the sensor module 114.

The value of the index may be incremented to the third value if the second sensor data exceeds the predetermined value (block 320). The control module 112 may increment the value of the index to the third value based on the second angular change of orientation of the device 100 that exceeds the predetermined value. In some implementations, the control module 112 may receive an event from the sensor module 114 to increment the value.

The third item is displayed in the region of the user interface based on the index being incremented to the third value (block 322). When the display module 106 receives the third value for the index from the control module 112, the display module 106 may retrieve display data to effect display of a corresponding third item that is associated with the third value of the index. The display module 106 may utilize the model module 108 to retrieve the data to effect display of the third item from the data storage 110. Thus, the third item replaces the second item in the region of the user interface in response to the change of angular orientation of the device 100. In some implementations, the display of the third item may include an animated transition from the second item to the third item. Such an animated transition may include rolling the second item into view and rolling the first item out of view, similar to a reel of a slot machine. In other implementations, the animated transition may include cross-fading from the first item to the second item. Still other animated transition may be implemented.

In some instances, such as when the second angular change of orientation is in an opposite direction as the first angular change of orientation, the control module may decrement the index back to the first value if the second sensor data exceed the predetermined value. In such an instance, the first item may again be displayed in the region of the user interface based on the index being decremented to the first value. The display module 106 may retrieve display data to effect display of the first item based on the association of the first item with the first value of the index. The display module 106 may utilize the model module 108 to retrieve the data to effect display of the first item from the data storage 110.

FIGS. 4A-4B depict an example user interface 400 that may be displayed on the display 104 of the device 100. The user interface 400 includes a label 420 and a region 410 in which several items, such as items 430, 432, 434, may be displayed one at a time. The item 430 may be a numerical value, a string value, an alphanumerical value, etc. The label 420 and the item 430 may be stored in a data structure in the data storage 110. The item 430 is associated with a value of an index, such as the value 2, for example. In the present example, items 432, 434 (shown faded) are not displayed when the user interface 400 is actually displayed on the display 104 of the device 100; rather, items 432, 434 are depicted for example purposes to demonstrate a previous item 432 and a next item 434 relative to the currently displayed item 430. Item 432 is associated with another value of the index, such as the value 1, and item 434 is associated with still another value of the index, such as the value 3. The items 430, 432, 434 form a set of items that may be displayed in the same region 410 of the user interface 400 and rotated through based upon a user input, such as an angular rotation of the device 100, and the value of the index.

The present example depicts a user interface for an approval process user interface. For example, managers or other supervisors may be required to approve or disapprove of various changes based on facts that have changed. As an example, a manager may have to decide on a promotion for an employee that may result in a change in annual salary. In the implementation shown, the label 420, such as "Annual Salary," may remain constant and the current and proposed values for the annual salary, such as items 430, 432, 434, may be displayed in the region 410 one at a time. By declining the device 100 for a few degrees, such as −15 or −20 degrees, the item 430, which may correspond to the old annual salary, may be replaced by item 434, which may correspond to the new annual salary, as shown in FIG. 4B. Thus, the data displayed by the user interface 400 may not need to display both the current annual salary and the proposed salary to provide the relevant context. Instead, the label 420, which may remain constant, can provide the relevant context and the data, corresponding to items 430, 434, can be incrementally displayed in the same region 410. Similarly, inclining the device 100 a few degrees, such as +15 or +20 degrees, may result in the proposed new salary value, or item 434, may be replace by the old annual salary, item 430. A third item 432, which may be a demotion of annual salary, may be displayed if the user inclines the device 100 for a few degrees again. In some implementations, the color for displayed value of each item 430, 432, 434 may be different. For example, item 430 may be associated with a black color, indicating the current value, item 434 may be associated with a green color indicating the next value, and item 432 may be associated with a red color indicating a previous value. Such colors may provide an additional visual cue to a user of the device 100 of the change between items 430, 432, 434.

When a user changes the angular orientation of the device 100, the one or more sensors 116 of FIG. 1 output raw sensor data to the sensor module 114. The sensor module 114 may determine whether the sensor data exceeds a predetermined value (such that incidental changes in angular orientation do not inadvertently swap items shown in the region 410). In the example shown in FIGS. 4A-4B, when the user sufficiently declines the device 100, then the sensor module 114 outputs a "next" event to the control module 112. The control module 112, in response to receiving the "next" event, increments the value of the index from a value of 2, which is associated with item 430, to a value of 3. The display module 106 receives the incremented value of the index from the control module 112 and retrieves the data to effect display of the item that corresponds to the newly incremented value of the index, which in the present example corresponds to item 434 and the value of 3 for the index. The display module 106 then effects display of the item 434 in the region 410 of the user interface 400 while leaving the label 420 unchanged. Thus, a user may efficiently swap information or items displayed in the same region 410 of a user interface 400 by simply rotating the device 100 with a single hand.

In some implementations, the sensor module 114 may determine the angular change in orientation of the roll of the device 100 such that items 430, 432, 434 may be swapped based on rolling the device left or right. In still further implementations, the items 430, 432, 434 may be animated when swapped, such as rolling from one item to the next, cross-fading, etc. Of course, it should be understood that the foregoing is merely an example and other user interfaces for displaying labels 420 and items 430, 432, 434 may be used as well.

FIGS. 5A-5B depict another example user interface 500 that may be displayed on the display 104 of the device 100. The user interface 500 includes a label 510 and image items 520, 522 that may be displayed in the same region of the user interface 500. The label 510 and the image items 520, 522 may be stored in a data structure in the data storage 110. Each image item 520, 522 is associated with a value of an index, such as the values 1 and 2, respectively, for example. In some implementations, the image items 520, 522 may depict a time series sequence of time dependent figures. In the example shown in FIGS. 5A-5B, a pair of time series image items 520, 522 for pie charts of annual revenues are shown. The label 510, "Revenue" in the present example, may remain constant even when the image items 520, 522 change, thereby preserving the context for the image items 520, 522. In other examples, the time series image items may depict a sequence of images showing an object varying in time, such as daily photos of a building under construction.

Similar to that described above in reference to switching between items 430, 432, 434 in FIGS. 4A-4B, starting with the first or the last or any otherwise image item of the time series, switching to the previous or next image item may be accomplished by inclining or declining the device 100, thereby causing the control module 112 to increment or decrement the value for the index in response to an event output from the sensor module 114. In some implementations, the switching between image items 520, 522 may be based on the roll angle of the device 100 by rolling the device left or right. In still further implementations, the image items 520, 522 may be animated when they are swapped, such as cross-fading from a first image item 520 to a second image item 522.

Figure 6A:
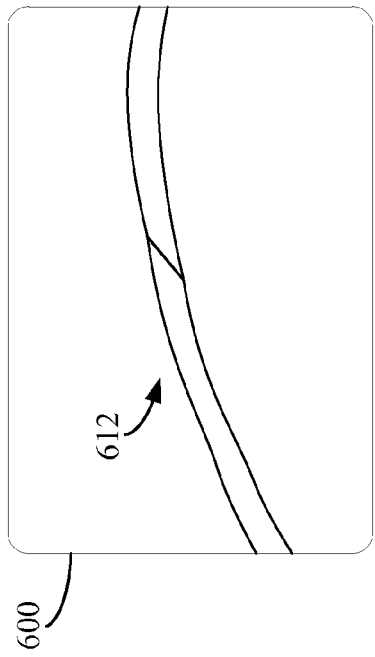
FIG. 6A is an illustration of an example user interface showing a first image item of an actual state being shown in a region of the user interface.
Figure 6B:
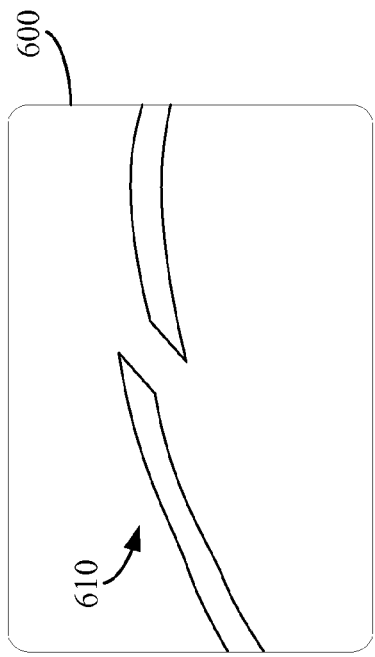
FIG. 6B is an illustration of the example user interface of FIG. 6A showing a second image item of a target state being shown in the region of the user interface after receiving sensor data indicating a change of angular orientation of the device.

FIGS. 6A-6B depict another example user interface 600 that may be displayed on the display 104 of the device 100. The user interface 600 includes image items 610, 612 that may be displayed in the same region of the user interface 600. In some implementations, the image items 610, 612 may also be displayed with a label (not shown), such as "Right Clavicle," for example, that may remain constant even though the image items 610, 612 change. The image items 610, 612 may be stored in a data structure in the data storage 110. Each image item 610, 612 is associated with a value of an index, such as the values 1 and 2, respectively, for example. The image items 610, 612 of the present example depict a broken bone in its actual state, corresponding to image item 610, and a target state, corresponding to image item 612. In instances where the differences may be difficult to perceive when the images are shown side-by-side, the differences may be more easily detected if the two images are cross-faded. For example, image items 610, 612 may be animated to cross-fade when transitioning. The cross-fading can be achieved by increasing the opacity of the second image item 612 and decreasing the opacity of the first image item 610. The direction and speed of the cross-fading may be controlled by angular change of orientation of the device 100 and/or the angular speed of the device 100. For example, the slowly pitching the device 100 down may result in a slow cross-fade from image item 610 to image item 612, while a subsequent rapid pitching of the device 100 upwardly may result in a fast cross-fade from image item 612 back to image item 610.

Similar to that described above in reference to switching between items 430, 432, 434 in FIGS. 4A-4B, switching between image items 610, 612 may be accomplished by inclining or declining the device 100, thereby causing the control module 112 to increment or decrement the value for the index in response to an event output from the sensor module 114. In some implementations, the switching between image items 610, 612 may be based on the roll angle of the device 100 by rolling the device left or right.

In yet another example, several image items may be included in a set of image items. For example, a series of spatially related images, such as computer tomography (CT) images of a patient, may be included in the set of spatially related image items. A doctor may access the CT images on a device 100, such as a tablet, and has comfortable access to transition through the spatially related image items by declining or inclining the tablet. The degree of inclination or declination may result in a slow or fast, forward or backward progression through the set of image items. For example, inclining the tablet between 10 degrees and 45 degrees may result in a slow progression through the set of image items, while inclining the tablet greater than 45 degrees may result in a fast progression through the set of image items. Thus, the user may transition through a set of data using a single hand to incline or decline the device 100, leaving the user with a free hand for other purposes.

Figure 7A:
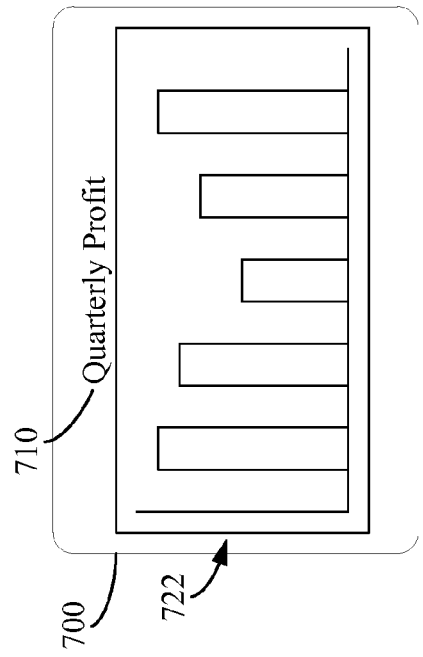
FIG. 7A is an illustration of an example user interface showing a data table view being shown in a region of the user interface.
Figure 7B:
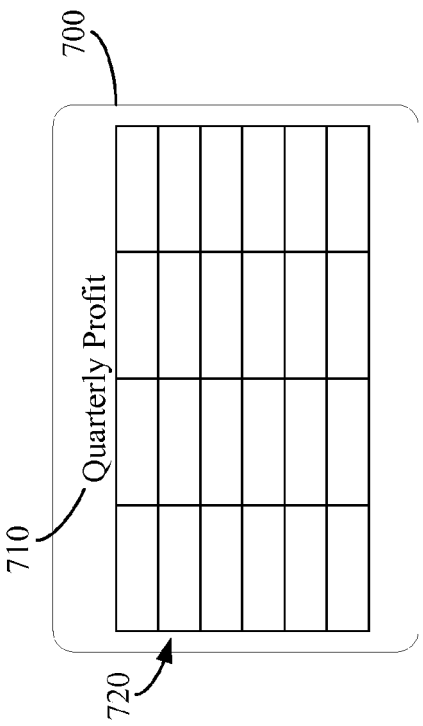
FIG. 7B is an illustration of the example user interface of FIG. 7A showing a graph view based on the data of the data table being shown in the region of the user interface after receiving sensor data indicating a change of angular orientation of the device.

FIGS. 7A-7B depict still another example user interface 700 that may be displayed on the display 104 of the device 100. The user interface 700 includes a label 710 and a data table view item 720 or a graph or chart view item 722 that may be displayed in the same region of the user interface 700. The label 710, the data table view item 720, and the graph or chart view item 722 may be stored in a data structure in the data storage 110. In one implementation, the data table view item 720 may be associated with a value of 0 for an index and the graph or chart view item may be associated with a value of 1 for the index. In other implementations, the data table view item 720 may be associated with a string of "table" for the index and the graph or chart view item may be associated with a string of "chart" for the index. The label 710 may remain constant even when the data table view item 720 transitions to the graph or chart view item 722, thereby preserving the context.

Similar to that described above in reference to switching between items 430, 432, 434 in FIGS. 4A-4B, switching between the data table view item 720 transitions to the graph or chart view item 722 may be accomplished by inclining or declining the device 100, thereby causing the control module 112 to increment or decrement the value for the index in response to an event output from the sensor module 114. In some implementations, the switching between the data table view item 720 transitions to the graph or chart view item 722 may be based on the roll angle of the device 100 by rolling the device left or right.

Examples of user interface controls that may be implemented by the display module 106 may include a "Layered Label" user interface control for string items, numerical items, and/or alphanumerical items; a "Layered Image" user interface control for image items; and a "Layered Chart" user interface control for tabular data items and/or chart items. Such user interface controls, instead of being able to display a single property "value," instead reference an ordered list of string items, numerical items, alphanumerical items, image items, tabular data items, and/or chart items.

By way of example only, the "Layered Label" user interface control may be an output control with a set of display list items (e.g., string items, numerical items, alphanumerical items, etc.) that is configured to display one item from the set at a time. A display list item may include a label and a value for the display list item. Displaying the previous or next data item from the set of display list items may occur when the display module 106 receives a change to a property displayedItemIndex. The change to the property displayedItemIndex may be controlled by the control module 112 and occur in response to receiving an event from the sensor module 114.

In some implementations, the transition from one display list item to another may be animated. The animated transition may include a parameter defining the length of the animated transition (e.g., 1000 milliseconds). In some implementations, the parameter may be based on the angular change of orientation (e.g., pitching up the device 100 to an angle of 30 degrees results in a transition length of 1000 milliseconds and pitching up the device 100 at an angle of 70 degrees results in a transition length of 500 milliseconds). In other implementations, the parameter defining the length of the animated transition may be based on the angular speed (e.g., an angular speed of the device 100 of 1 radian per second results in a transition length of 1000 milliseconds and an angular speed of the device 100 of 2 radians per second results in a transition length of 500 milliseconds). In still other implementations, the parameter defining the length of the animated transition may be based on both the angular change of orientation and the angular speed.

In some implementations, the animation may roll, similar to a reel of a slot machine, from one display list item to the next (or, in instances where the index value increments multiple values, through several display list items). In other implementations, the animation may fade out the first display list item and fade in a subsequent display list item (e.g., cross-fading). In some further implementations, the current display list item may be associated with a first color and the next display list item may be associated with a second color (thereby visually distinguishing the two values).

The "Layered Label" user interface control may include a function setDisplayedItemIndex(index) that may be utilized by the control module 112 to increment or decrement the index for the display module 106. The "Layered Label" control may also include a function getDisplayedItemIndex( ) to retrieve a display list item to be displayed on a display 104 of the device 100 based on the value for the index. The variable index may be a 0—based index for the set of display list items. If the value of index is negative or greater than the current size of the set of display list items, then an exception may occur.

In another example, the "Layered Image" user interface control may be an output control with a set of image items that is configured to display one image at a time. An image item may include a label and a value for the image, such as a file name, location (a local location or a remote location, such as a URL), etc. Displaying the previous or next image item in the set of image items may occur when the display module 106 receives a change to a property displayedImageIndex. The change to the property displayedImageIndex may be controlled by the control module 112 and occur in response to receiving an event from the sensor module 114.

In some implementations, the transition from one image item to another may be animated. The animated transition may include a parameter defining the length of the animated transition (e.g., 1000 milliseconds). In some implementations, the parameter may be based on the angular change of orientation (e.g., pitching up the device 100 to an angle of 30 degrees results in a transition length of 1000 milliseconds and pitching up the device 100 at an angle of 70 degrees results in a transition length of 500 milliseconds). In other implementations, the parameter defining the length of the animated transition may be based on the angular speed (e.g., an angular speed of the device 100 of 1 radian per second results in a transition length of 1000 milliseconds and an angular speed of the device 100 of 2 radians per second results in a transition length of 500 milliseconds). In still other implementations, the parameter defining the length of the animated transition may be based on both the angular change of orientation and the angular speed.

In some implementations, the animation may fade out the first image item and fade in a subsequent image item (e.g., cross-fading). In other implementations, the animation may be configured to oscillate between the current image item and the subsequent image item.

The "Layered Image" user interface control may include a function setDisplayedImageIndex(index) that may be utilized by the control module 112 to increment or decrement the index for the display module 106. The "Layered Image" control may also include a function getDisplayedImageIndex( ) to retrieve an image item to be displayed on a display 104 of the device 100 based on the value for the index. The variable index may be a O-based index for the set of image items. If the value of index is negative or greater than the current size of the set of image items, then an exception may occur.

In yet another example, the "Layered Chart" user interface control may be an output control that can render a set of data as a data table or as graph or chart. In one implementation, the index may control which view is visible (e.g., and index value of 0 is associated with the data table view and an index value is associated with the graph or chart view). In other implementations, the index may instead utilize strings of "table" for the data table view and "chart" for the graph or chart view. Accordingly, the control module 112 may be configured to change the string from table to chart and vice-versa in response to receiving an event from the sensor module 114.

In some implementations, the transition from the data table view to the graph or chart view and vice-versa may be animated. The animated transition may include a parameter defining the length of the animated transition (e.g., 1000 milliseconds). In some implementations, the animation may fade out the data table view and fade in the graph or chart view (e.g., cross-fading) or vice-versa.

The "Layered Chart" user interface control may include a function setDisplayedView(index) that may be utilized by the control module 112 to modify the index for the display module 106. The "Layered Chart" control may also include a function getDisplayedView ( ) to retrieve the view to be displayed on a display 104 of the device 100 based on the value or string of the index.

Figure 8:
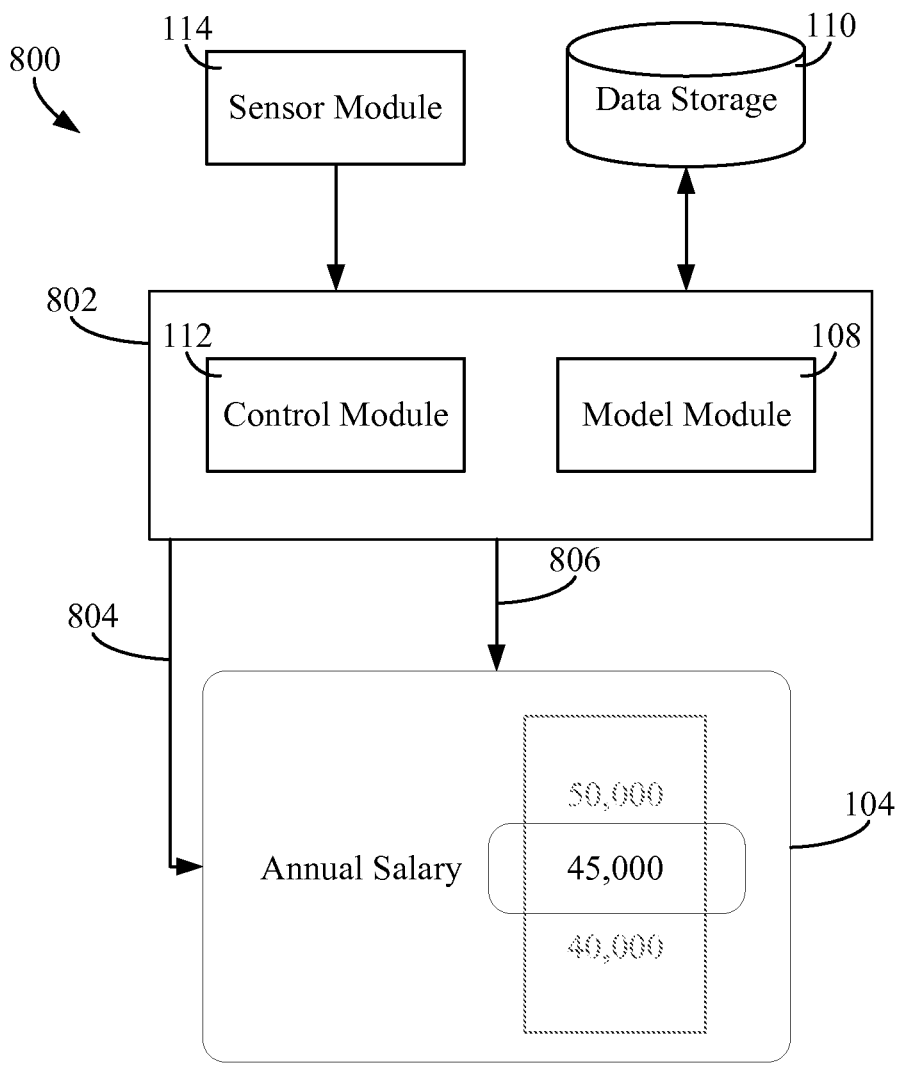
FIG. 8 is an example block diagram showing an example user interface with business logic for controlling displayed items on the user interface.

FIG. 8 depicts an example system 800 having a user interface displayed on a display 104 with business logic 802 for controlling displayed items on the user interface. In some implementations, the business logic 802 may include the control module 112 and/or the model module 108. The business logic 802 receives events from the sensor module 114 and data from the data storage 110. In one example, the business logic 802 instantiates 804 a single figure for display, which may include a label, such as text, and also instantiates 804 an indexed list in a memory. An initial item of the list, such as a numerical figure, may be dedicated for initial display. Subsequent items from the indexed list, such as other numerical figures, may be retrieved, such as from a local database, such as data storage 110, or a remote database (not shown). The business logic 802 utilizes event handling controls 806, such as controls "Layered Label", "Layered Image", and "Layered Chart" described herein, for control and/or development of user interfaces with the described behavior.

The measured inclinations from sensors coupled to the sensor module 114 may be accessible via application programming interfaces (APIs). Changing values of the sensors trigger events output by the sensor module 114 that are handled by listeners in the business logic 802. The listeners interpret the events and call the corresponding method of the event handling control 806, such as "Layered Label." In the example shown implementing the "Layered Label" event handling control 806, the "Layered Label" event handling control 806 swaps the displayed list item, such as numerical figures, and changes the visible data among the memorized data.

According to various implementations, the processes and/or methods described herein can be implemented by the device 100 of FIG. 1 in response to the processing module 102 executing an arrangement of instructions contained in a main memory. Such instructions can be read into the main memory from another computer-readable medium, such as data storage 110. Execution of the arrangement of instructions contained in the main memory causes the device 100 to perform the illustrative processes and/or method steps described herein. Implementations of the subject matter and the operations described in this specification can be implemented in digital electronic circuitry, or in computer software embodied on a non-transitory tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The term "computing device" or "processing module" encompasses all kinds of apparatuses, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While this specification contains many specific implementation details, these should not be construed as limitations on the scope of what may be claimed, but rather as descriptions of features of some implementations. Certain features described in this specification in the context of separate implementations can also be implemented in combination in a single implementation. Conversely, various features described in the context of a single implementation can also be implemented in multiple implementations separately or in any subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from scope of the appended claims. All implementations that come within the scope of the following claims and equivalents thereto are claimed.

What is claimed is:

1. A device comprising:
   a sensor;
   one or more data processors; and
   a non-transitory computer readable storage device storing instructions that, when executed by one or more data processors of the device, cause the one or more data processors to perform operations comprising:
      receiving data having a first item and a second item, wherein the first item is different than the second item, the first item is associated with a first value of an index and the second value is associated with a second value of the index, wherein an orientation of the device in a first range of angles causes a control module to set the index to the first value of the index and an orientation of the device in a second range of angles causes the control module to set the index to the second value of the index different than the first value of the index,
      receiving the first value of the index,
      displaying the first item in a region of a user interface displayed on a display of the device based on the first value of the index,
      receiving first sensor data from the sensor of the device, wherein the first sensor data is indicative of a first angular change of orientation of the device,
      determining if the first sensor data exceeds a predetermined value, incrementing the index to the second value if the first sensor data exceeds the predetermined value, and
      displaying the second item in the region of the user interface displayed on the display of the device based on the index being incremented to the second value associated with the second item, wherein the second item replaces the first item and the first item ceases to be displayed.

2. The device of claim 1, wherein the sensor data is indicative of an angular change of pitch of the device.

3. The device of claim 1, wherein the sensor data is indicative of an angular change of roll of the device.

4. The device of claim 1, wherein the first item and the second item are numerical values.

5. The device of claim 4, wherein the first item is associated with a first color and the second item is associated with a second color.

6. The device of claim 1, wherein the first item is a first image and the second item is a second image.

7. The device of claim 6, wherein the first image and the second image are time series images.

8. The device of claim 6, wherein the first image and the second image are spatially related images.

9. The device of claim 1, wherein the first item is a data table and the second item is a graph based on data of the data table.

10. The device of claim 1, wherein the displaying of the second item includes an animation transitioning from the first item.

11. The device of claim 1, wherein the received data includes a third item associated with a third value of the index, wherein the non-transitory computer readable storage device stores instructions that cause the one or more data processors to perform operations further comprising:
  receiving second sensor data from the sensor of the device, wherein the second sensor data is indicative of a second angular change of orientation of the device, wherein the second angular change of orientation is in a same direction as the first angular change of orientation,
  determining if the second sensor data exceeds the predetermined value,
  incrementing the index to the third value if the second sensor data exceeds the predetermined value, and
  displaying the third item in the region of the user interface displayed on the display of the device based on the index being incremented to the third value associated with the third item.

12. The device of claim 1, wherein the non-transitory computer readable storage device stores instructions that cause the one or more data processors to perform operations further comprising:
  receiving second sensor data from the sensor of the device, wherein the second sensor data is indicative of a second angular change of orientation of the device, wherein the second angular change of orientation is in an opposite direction as the first angular change of orientation,
  determining if the second sensor data exceeds the predetermined value,
  decrementing the index to the first value if the second sensor data exceeds the predetermined value, and
  displaying the first item in the region of the user interface displayed on the display of the device based on the index being decremented to the first value associated with the first item.

13. A method of incrementally displaying related items in a common region on a display of a mobile device, the method comprising:
  displaying, using a display module, a first item in a region of a user interface displayed on a display of a mobile device based on an index having a first value, wherein the first value is associated with the first item;
  receiving, at a sensor module, first sensor data from a first sensor of the mobile device, wherein the first sensor data is indicative of an angular change of orientation of the mobile device;
  outputting, by the sensor module, a next event to increment the index to a second value based on the first sensor data relative to prior sensor data;
  incrementing, using a control module, the index to the second value in response to the outputted next event, wherein an orientation of the device in a first range of angles causes the control module to set the index to the first value of the index and an orientation of the device in a second range of angles causes the control module to set the index to the second value of the index different than the first value of the index; and
  displaying, using the display module, a second item in the region of the user interface based on the index having the second value, wherein the second value is associated with the second item, wherein the second item replaces the first item and the first item ceases to be displayed.

14. The method of claim 13 further comprising:
  receiving, at the sensor module, second sensor data from a second sensor of the mobile device; and
  incrementing, using the control module, the index at an increment rate based on the second sensor data.

15. The method of claim 14, wherein the second sensor data is indicative of an angle of the mobile device relative to a datum.

16. The method of claim 14, wherein the second sensor is a gyroscope and wherein the second sensor data is an angular speed.

17. The method of claim 13 further comprising:
  outputting, by the sensor module, a second next event to increment the index to a third value based on the first sensor data relative to the prior sensor data;
  incrementing, using the control module, the index to the third value in response to the outputted second next event; and
  displaying, using the display module, a third item in the region of the user interface based on the index having the third value, wherein the third value is associated with the third item.

18. A device comprising:
  a model module configured to define a set of items stored in a non-transitory computer-readable storage device of the device, wherein each item of the set of items is associated with a different value of an index, the set of items including at least a first item and a second item;
  at least one sensor;
  a sensor module configured to receive sensor data from the at least one sensor and to output an event based on the sensor data;
  a control module configured to receive the event outputted by the sensor module and to modify the value of the index based on the received event, wherein an orientation of the device in a first range of angles causes the control module to set the index to the first value of the index and an orientation of the device in a second range of angles causes the control module to set the index to the second value of the index different than the first value of the index; and
  a display module configured to:
    display, in a common region of a user interface displayed on a display of the device, a first item of the set of items based on the index indicating the first value, wherein the first value is associated with the first item, and
    display the second item in the common region of the user interface displayed on the display of the device based on the index being incremented to the second value associated with the second item, wherein the second item replaces the first item and the first item ceases to be displayed.

19. The device of claim 18, wherein the set of items is a set of related numerical values or a set of related images.

20. The device of claim 18., wherein the display module is further configured to animate a transition from the first item of the set of items to the second item of the set of items.

* * * * *